(No Model.) 4 Sheets—Sheet 1.
G. PRITCHARD.
APPARATUS FOR MAKING UP PACKETS OF POWDERED MATERIALS, &c., FOR SALE.
No. 249,544. Patented Nov. 15, 1881.
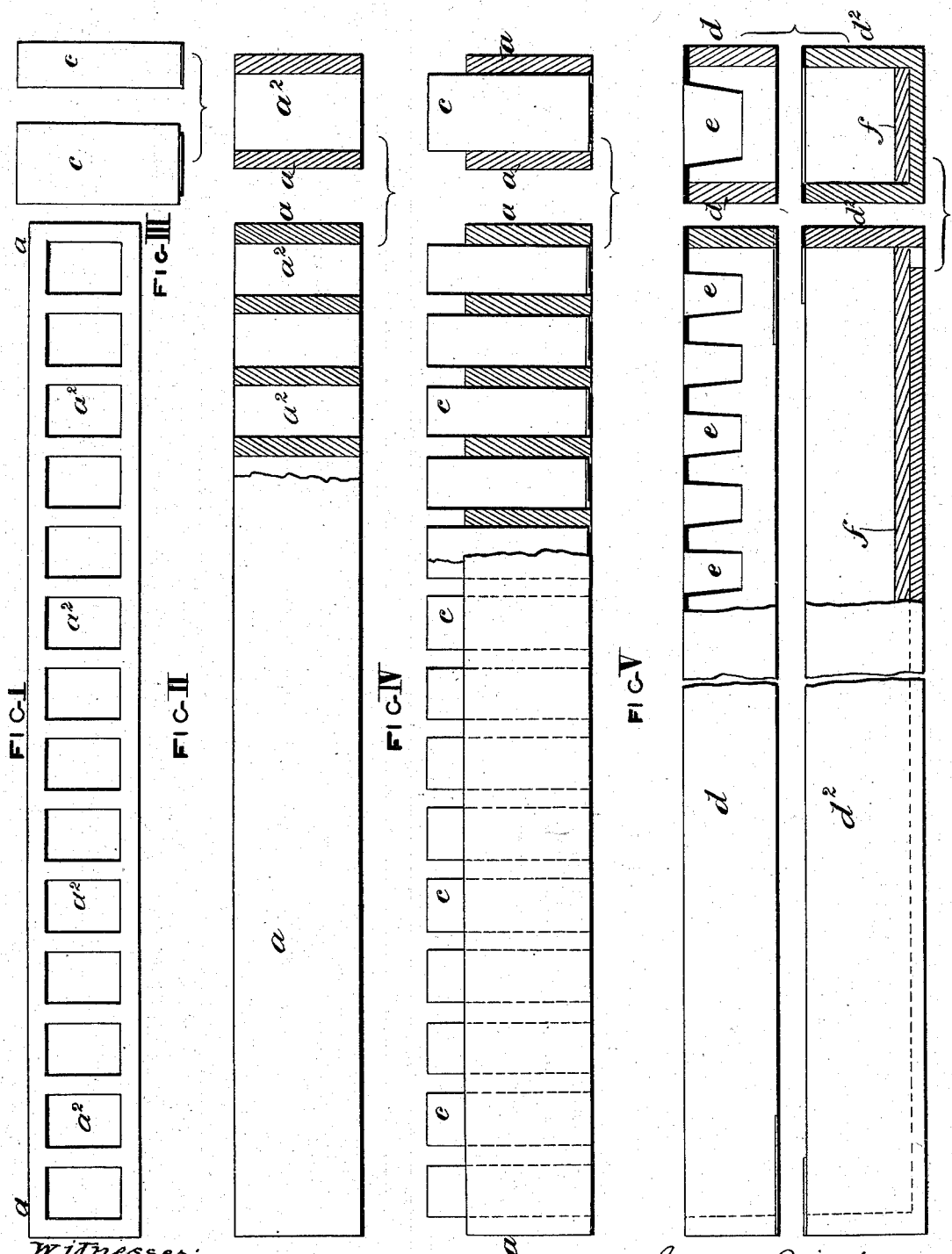
Witnesses:
E. E. Masson
W. B. Masson
George Pritchard
by A. Pollok
his attorney (No Model.) 4 Sheets—Sheet 2.
G. PRITCHARD.
APPARATUS FOR MAKING UP PACKETS OF POWDERED MATERIALS, &c., FOR SALE.
No. 249,544. Patented Nov. 15, 1881.
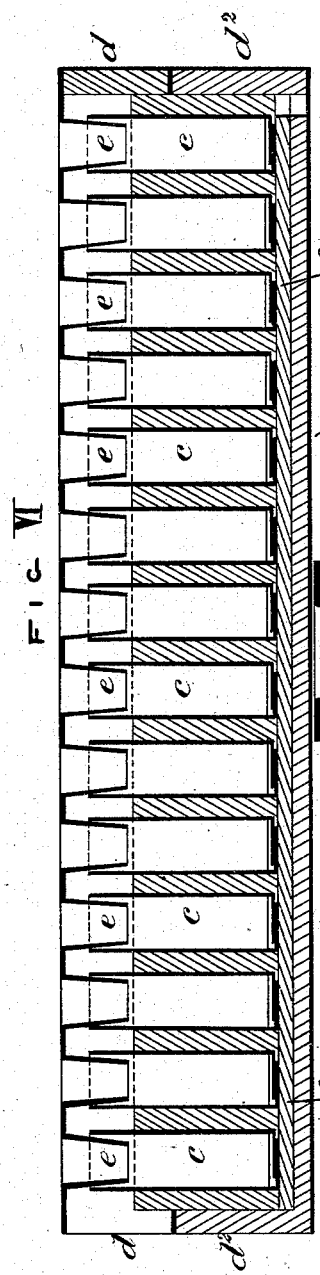
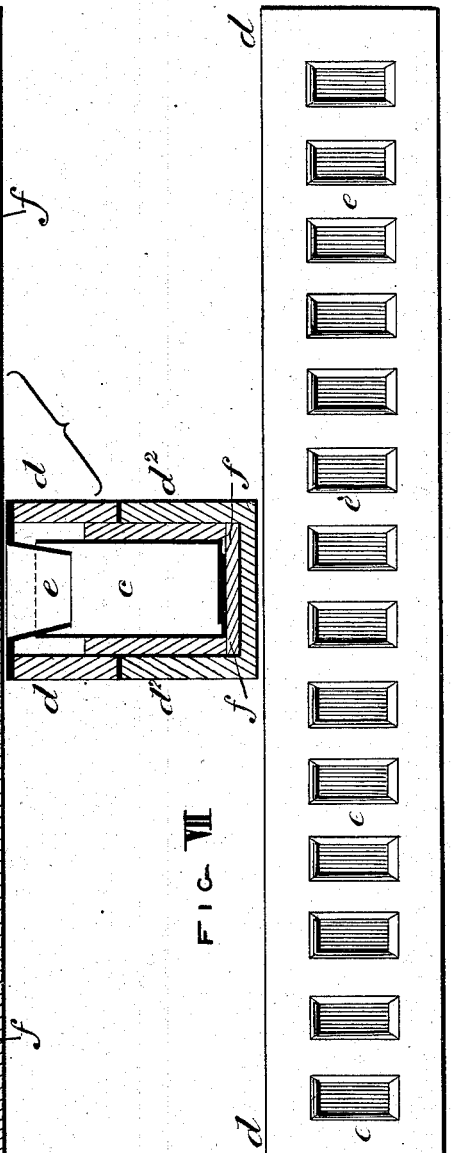
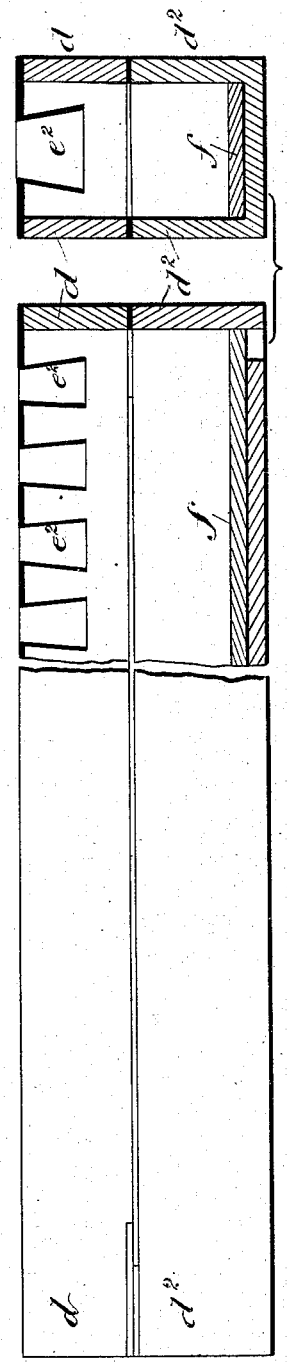
Witnesses:
E. E. Masson
W. B. Masson
Inventor
George Pritchard
by A. Pollok
his attorney (No Model.) 4 Sheets—Sheet 3.
G. PRITCHARD.
APPARATUS FOR MAKING UP PACKETS OF POWDERED MATERIALS, &c., FOR SALE.
No. 249,544. Patented Nov. 15, 1881.
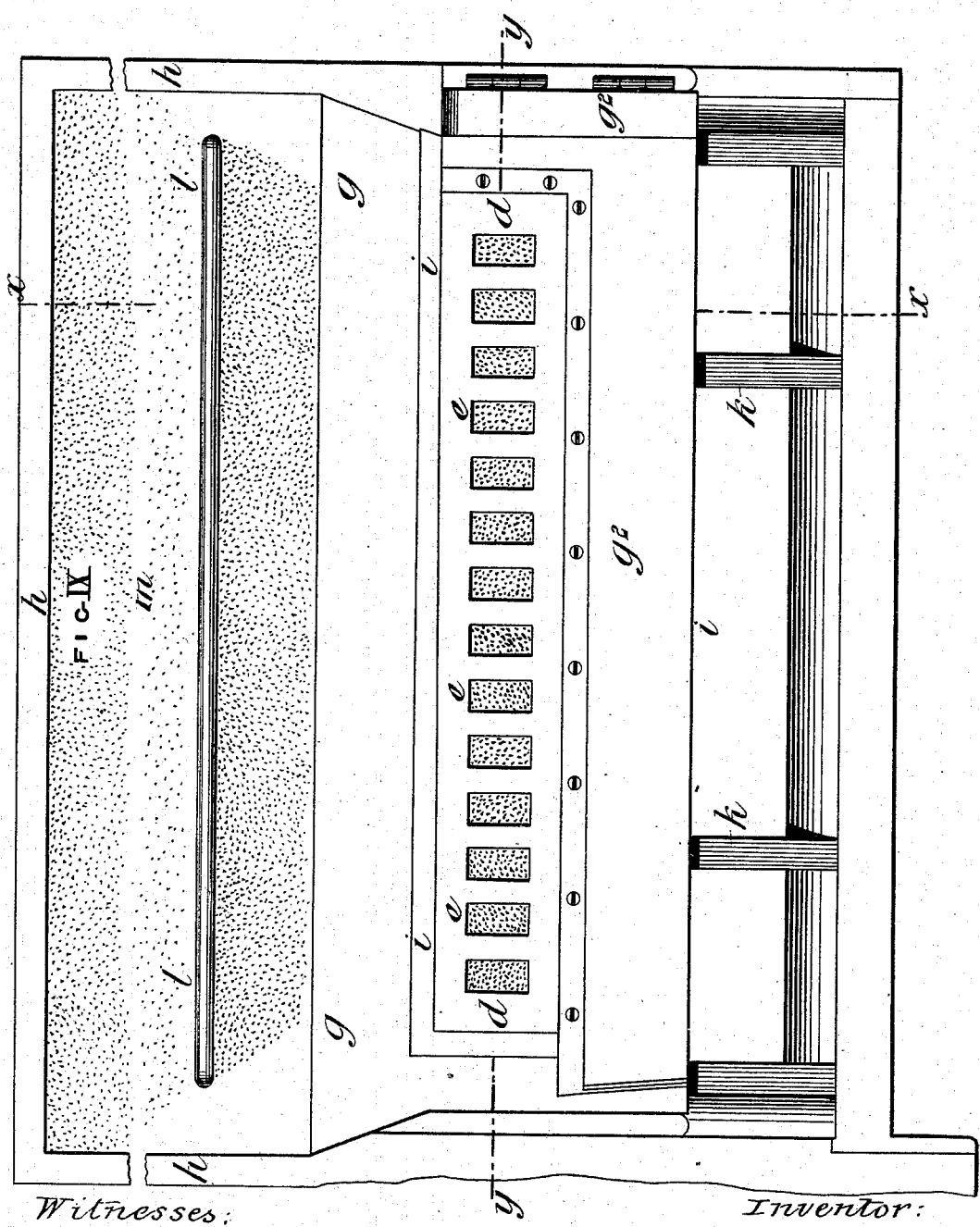
Witnesses:
E. E. Masson
W. B. Masson
Inventor:
George Pritchard
by A. Pollok
his attorney (No Model.)  4 Sheets—Sheet 4.
G. PRITCHARD.
APPARATUS FOR MAKING UP PACKETS OF POWDERED MATERIALS, &c., FOR SALE.
No. 249,544. Patented Nov. 15, 1881.
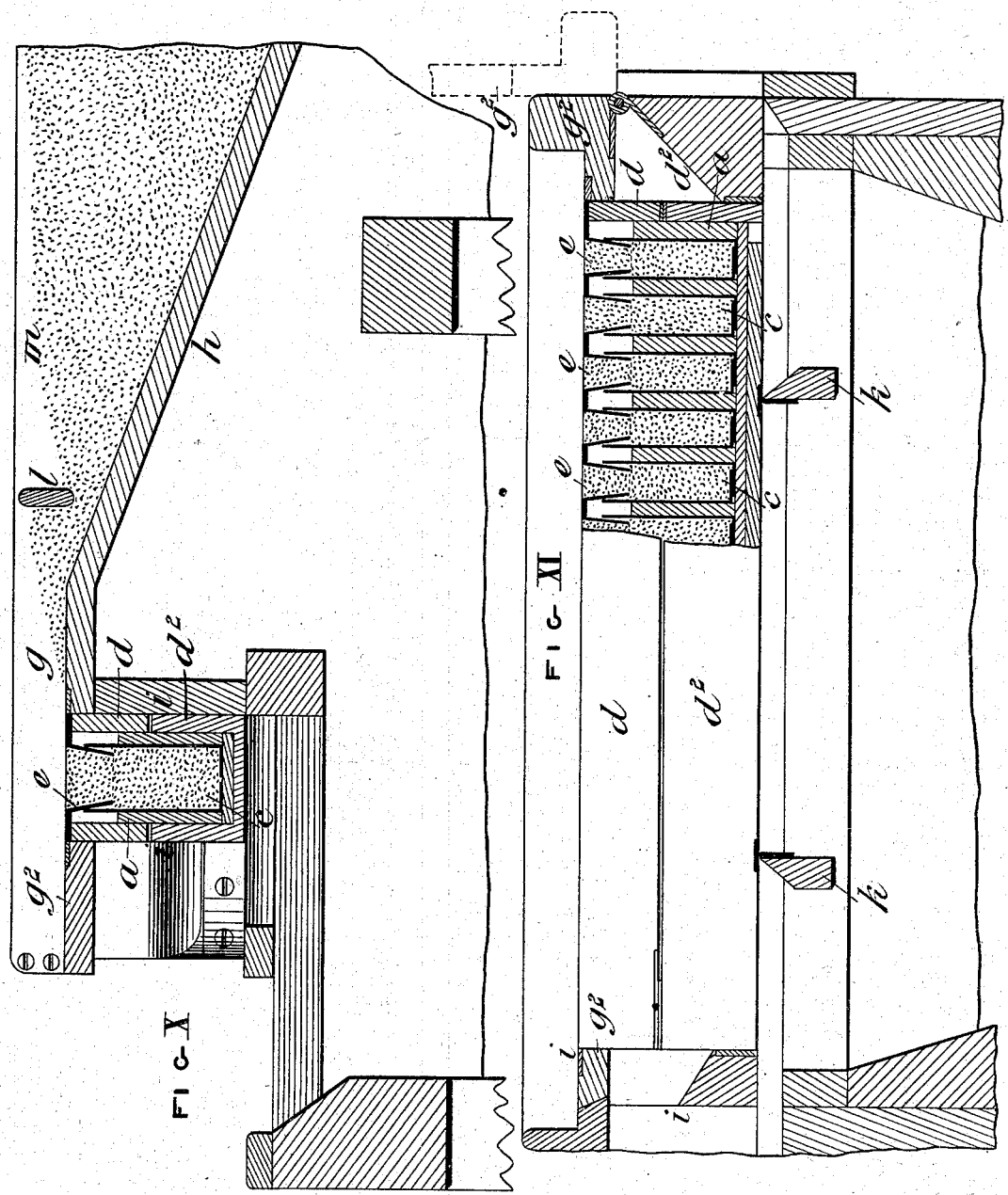

UNITED STATES PATENT OFFICE.

GEORGE PRITCHARD, OF SEAFORTH, NEAR LIVERPOOL, COUNTY OF LANCASTER, ASSIGNOR TO ROBERT SPEAR HUDSON, OF LIVERPOOL, ENGLAND.

APPARATUS FOR MAKING UP PACKETS OF POWDERED MATERIALS, &c., FOR SALE.

SPECIFICATION forming part of Letters Patent No. 249,544, dated November 15, 1881.

Application filed September 17, 1881. (No model.) Patented in England March 23, 1881.

*To all whom it may concern:*

Be it known that I, GEORGE PRITCHARD, a subject of the Queen of Great Britain, residing at Seaforth, near Liverpool, in the county of Lancaster, England, have invented certain new or Improved Filling Machinery or Apparatus to be used in Making up Packets of Powdered Materials and other Commodities for Sale, (for which I have received Letters Patent in England, No. 1,299, dated 23d March, 1881,) of which the following is a specification.

My invention consists of the construction and combination of the parts, hereinafter described, of machinery or apparatus to be used for filling at one operation a series of bag-like wrappers or cases with powdered materials or other commodities, to be afterward made up into packets for sale.

The machinery or apparatus constructed according to my invention consists, essentially, of a partitioned or divided box open at top and bottom, which box I will hereinafter call the "mold," and a box made in longitudinal halves, the upper half of the box being provided with a series of conical filling-hoppers equal in number to the divisions or partitions in the mold. In the partitioned or divided mold described the bag-like wrappers or cases, open at one end, are placed, and are held in the said mold during the filling, consolidating, folding, or creasing and pressing operations. When the bag-like wrappers are placed in the mold their open ends project from the divisions in the said mold. The mold, carrying its bags, is placed in the lower half of the divided box, before referred to, and the upper half, carrying the filling-hoppers, is arranged on the lower half-box, so that the said hoppers pass into the open ends of the bags placed in the mold. By drawing the powdered material into the hoppers those portions of the bags below the inner ends of the hoppers are filled with the powdered material, as well as the hoppers themselves, the spaces between the hoppers and the upper parts of the bags being unoccupied by powder. On lifting the upper or hopper half of the divided box from the mold the powder in the hoppers passes into the bags up to a short distance of their open mouths or ends. When the materials used are of a cloggy nature inverted hoppers may be combined with the upper half of the divided box—that is to say, the wide ends of the conical hoppers are situated undermost. In order to compensate for the varying densities or specific gravities of the material being used, so as to insure a uniform weight of material being fed to the bags, plates, made by preference of metal of varying thicknesses, are placed as required in the bottom of the hopper-box beneath the mold.

I will now describe, with reference to the accompanying drawings, the manner in which my invention is to be applied.

Figure 1 represents in plan, and Fig. 2 partly in elevation and partly in longitudinal vertical section and in cross-section, the partitioned or divided mold of the filling machinery, the said mold consisting of a divided box, $a$, having a series of chambers, $a^2 a^2$, in it, open at top and bottom, for receiving the bag-like wrappers or cases $c c$, one of which is represented detached in Fig. 3.

Fig. 4 represents, partly in elevation and partly in longitudinal section and in cross-section, the partitioned or divided mold $a$, with the series of bag-like wrappers or cases $c c$ placed in the chambers of the said mold.

Fig. 5 represents, partly in side elevation and partly in longitudinal section and in cross-section, the divided box and its hoppers and specific-gravity plate.

Fig. 6 represents in longitudinal section and cross-section, and Fig. 7 in plan, the partitioned mold $a$ $a^2$, carrying the bag-like wrappers placed in the divided and hoppered box, ready for filling the bag-like wrappers. The said divided box is made in longitudinal halves, the halves being marked respectively $d$ and $d^2$. The upper half, $d$, of the box is provided with a series of conical filling-hoppers, $e e$, equal in number to the chambers $a^2 a^2$ in the divided mold $a$. $f$ is the specific-gravity plate at the bottom of the lower half, $d^2$, of the divided box $d$ $d^2$. This plate $f$ is made, by preference, of metal, and can at pleasure be replaced by others of different thicknesses. By the use of plates $f$ of different thicknesses the varying densities of the material with which the bags are to be filled may be compensated for and a uniform weight of the material fed to the bags insured.

Fig. 8 represents, partly in longitudinal section and partly in side elevation and in cross-section, the divided box $d$ $d^2$, provided with inverted filling-hoppers, (marked $e^2$ $e^2$,) to be used when the material with which the bag-like wrappers are to be filled is of a cloggy nature. It will be seen, by referring to the drawings, that the wide ends of the conical hoppers $e^2$ $e^2$ are situated undermost.

Fig. 9 represents in plan, and Figs. 10 and 11 in cross-section, the filling-table, which I use with the divided or divisioned mold $a$ $a^2$ and the divided box $d$ $d^2$ and its hoppers $e$ $e$, the said mold containing the series of bag-like wrappers $c$ $c$ which have been filled with the powdered material in the manner hereinafter explained. The section Fig. 10 is taken on the line $x$ $x$, Fig. 9, and the section Fig. 11 is taken on the line $y$ $y$, Fig. 9. The said Figs. 9, 10, and 11 are drawn to a smaller scale than Figs. 1, 2, 3, 4, 5, 6, and 7.

The table $g$ is inclined at its back $h$, where the material with which the bags are to be filled is stationed. The said table $g$ is furnished with a well or depression at $i$ of a size proper to receive the divided box $d$ $d^2$ and its mold. Jointed to one side of the said table is a stay or holding-leaf, $g^2$. The said stay or leaf $g^2$ has the angular figure represented, and is capable of being turned down into the horizontal position represented, or of being raised into the vertical position indicated in dotted lines in Fig. 11. When shut down it is made to embrace or inclose two sides of the divided box $d$ $d^2$, and thus secure the said box and its contents in the well at $i$. The said stay or leaf $g^2$ also forms an extension of the table $g$ at the front and end of the divided box $d$ $d^2$. The divided box $d$ $d^2$ is supported in the well $i$ by T-pieces carried by the cross-bars $k$ $k$, (see Fig. 11,) and when so supported the open tops of the hoppers $e$ $e$ of the divided box are on the same level as the horizontal part $g$ of the filling-table and its stay or leaf $g^2$, as seen in Fig. 10.

I will now describe the manner in which the filling is effected.

The empty bag-like wrappers $c$ $c$ having been placed in the divided or partitioned mold $a$ $a^2$ so that their open ends project from the divisions or chambers $a^2$ therein, as represented in Fig. 4, the said filled mold is placed in the lower half, $d^2$, of the divided box $d$ $d^2$, Fig. 5, the said mold resting upon the specific-gravity plate $f$, as represented in Fig. 6. The upper or hopper half, $d$, of the divided box $d$ $d^2$ is next arranged on the lower half-box, $d^2$, as represented in the said Fig. 6, the several hoppers $e$ $e$ passing more or less into the open ends of the bags or wrappers $c$ $c$, placed in the mold, according to the thickness of the specific-gravity plate $f$ used. The divided box $d$ $d^2$, containing the mold $a$ $a^2$, with its empty bag-like wrappers or cases $c$ $c$, Figs. 6 and 7, is next transferred to the filling-table, (represented in Figs. 9, 10, and 11,) and placed in the well $i$ in the said table, and fixed in its place by turning down the hinged stay or holding leaf $g^2$, as shown in the said Figs. 9, 10, and 11. The bags are now ready to be filled. This is effected by the attendant drawing the powdered material by means of the draw-bar or scraper-bar $l$ from the store at $m$ onto the horizontal part $g$ of the table, and from thence into the hoppers $e$ $e$ until the bags $c$ $c$ and the said hoppers are filled with the powdered material. It will be seen by an examination of the sections, Figs. 10 and 11, that the powdered material does not fill the spaces between the hoppers and the upper parts of the bags, so that when the upper or hopper half, $d$, of the divided box $d$ $d^2$ is lifted from the mold $a$ the powder in the said hoppers passes into the bags up to a short distance of their open mouths or ends. The powder in the hoppers is thus used to complete the filling of the bags to the required height. In this way the bags are filled with a measured quantity of the powder, the varying densities of the material which is to be measured being compensated for by changing, as required, the specific-gravity plate $f$, as before described, and thus increasing or diminishing the spaces between the hoppers and the upper parts of the bags which are not filled with the material.

Although for convenience of description I have only described my invention as applied to the making up of powdered materials for sale, yet I wish it to be understood that my said invention is equally applicable to the making up for sale of other commodities, such as sugar, tea, seeds, and the like; but I do not, however, limit the use of my invention to any particular material.

Having now described the nature of my invention and the manner in which the same is to be carried into effect, what I claim is—

1. A filling apparatus comprising, in combination, a divided hoppered box, a partitioned mold fitting within the said box, and a filling-table provided with a hinged leaf or stay, the said hoppered box fitting flush with the top of said table in a well formed in part by a movable leaf or stay, substantially as described.

2. The combination, with the hoppered box and partitioned mold fitting within said box, of the plates herein called "specific-gravity plates," adapted to fit within said hoppered box below the mold, substantially as described.

GEORGE PRITCHARD. [L. S.]

Witnesses:
W. P. PAULL,
*Vice and Dep'y Consul, U. S. A., at Liverpool.*
W. I. SULIS,
*U. S. Consulate, Liverpool.*